March 8, 1960     R. L. MILLER     2,927,969
DETERMINATION OF PITCH FREQUENCY OF COMPLEX WAVE
Filed Oct. 20, 1954     3 Sheets-Sheet 1

INVENTOR
R. L. MILLER
BY Harry C. Hart
ATTORNEY

March 8, 1960  R. L. MILLER  2,927,969
DETERMINATION OF PITCH FREQUENCY OF COMPLEX WAVE
Filed Oct. 20, 1954  3 Sheets-Sheet 2
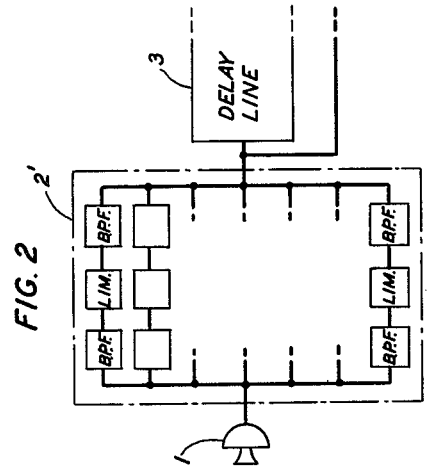
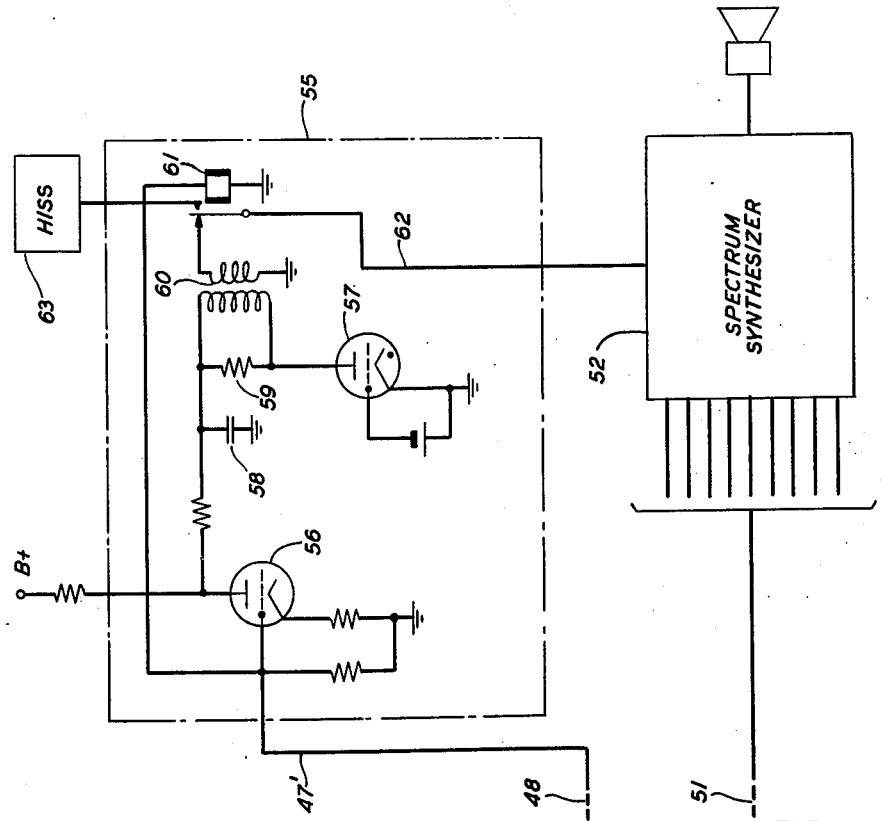
INVENTOR
R. L. MILLER
BY Harry C. Hart
ATTORNEY

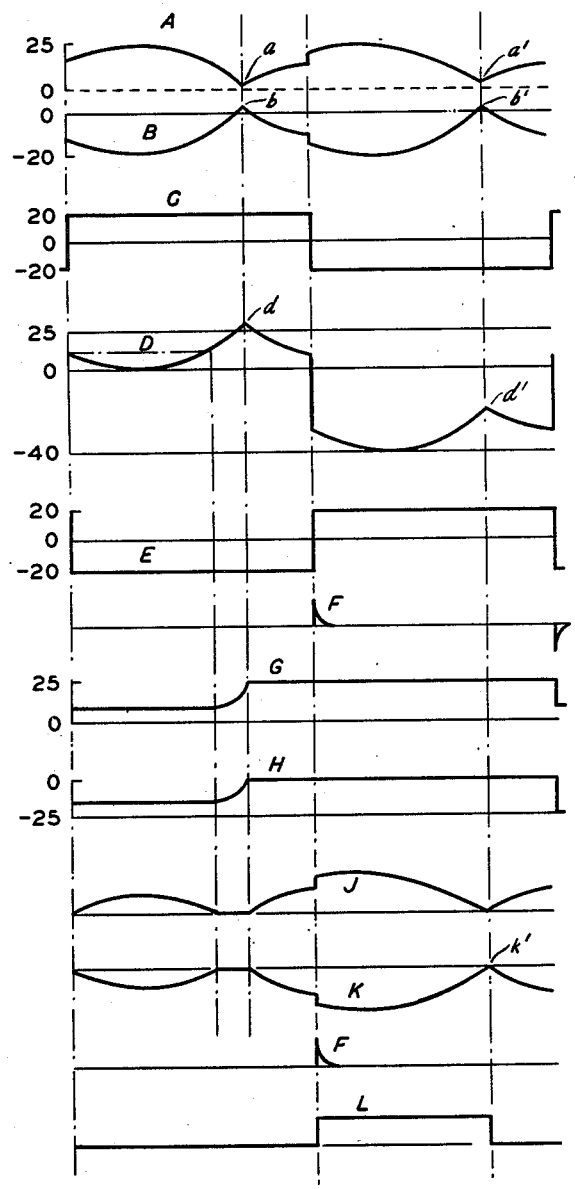

2,927,969
Patented Mar. 8, 1960

2,927,969

DETERMINATION OF PITCH FREQUENCY OF COMPLEX WAVE

Ralph L. Miller, Chatham, N.J., assignor to Bell Telephone Laboratories, Incorporated, New York, N.Y., a corporation of New York Application October 20, 1954, Serial No. 463,549

8 Claims. (Cl. 179—15.55)

This invention relates to electrical communication and particularly to the derivation from a signal such as speech of significant indicia of its characteristics for transmission to a remote point where they may be utilized to control the reconstruction of the signal.

A primary object of the invention is to improve the accuracy and reliability of determinations of the fundamental frequency or pitch of a signal, e.g., a voice signal to be transmitted. A related object is to carry out such pitch determinations even while the pitch itself is changing.

Signal analyzing and synthesizing systems of the so-called "vocoder" type have been described wherein the information content of a signal such as a speech wave is extracted in the form of a number of slowly varying unidirectional currents or voltages which are then used to control the operation of synthesizing apparatus in reconstructing the original wave. Systems of this class form the subject of H. W. Dudley Patents 2,151,091 and 2,243,527, as well as other patents and publications.

For the reconstructed speech to have a natural and realistic character, it is essential in such a system to carry out an accurate determination of the fundamental frequency or pitch of the speech wave, to derive an unambiguous indication thereof for use as a control signal in the reconstruction apparatus, and to do so continuously.

In the past various approaches to this problem of pitch determination have been proposed. In general the procedure has been to employ wave filter apparatus to segregate the fundamental component from all other components, and then to employ a frequency indicator such as a cycle counter to determine the frequency of the energy passing through the filter. Aside from modifications of detail, the output of the frequency indicator has then been accepted as a measure of the voice pitch.

The construction of a reliable system of this character has always presented a difficult problem to the engineer. Many voices are so rich in harmonic components that the energy of the fundamental component is small in comparison with the harmonic energy, and is therefore difficult to segregate. Under some conditions the energy at the fundamental frequency disappears entirely and resort must be had to some indirect measure, such as the intermodulation of adjacent harmonic components, to derive a difference frequency. Aside from the complexities entailed, such difference frequency is a true measure of the voice pitch only in the case of a steady sound, while variations of frequency and of phase of the intermodulated components in the course of inflection causes such instantaneous frequency to be wholly inadequate.

The present invention approaches the problem of pitch determination in the time domain instead of the frequency domain; i.e., it seizes hold of the fundamental period of the voice instead of its fundamental frequency, and tracks it, i.e., continues to hold it, as it changes. It is characteristic of a periodic wave, no matter how complex that, after a certain time interval known as the period, its form is a repetition of what has gone before. In the case of an exactly periodic wave the repetition is exact. In the case of a nearly periodic wave (and syllabic rates in speech are so slow compared with voice frequencies of interest that every voiced speech wave is periodic or nearly periodic) the repetition is inexact and approximate, but neverthless easily recognizable. Such repetition or near repetition of the waveform in successive periods holds good quite aside from the existence of physical energy at the fundamental frequency.

The invention turns these considerations to account by dividing the voice wave into two paths, delaying the energy in one with respect to that in the other by a controllable amount, balancing the delayed wave against the undelayed wave, varying the amount of delay until a best balance is obtained, and noting the corresponding amount of delay, with the recognition that this amount of delay is, identically, the fundamental period. A period control current is then derived which can serve as well as a pitch control current, the period and the pitch being reciprocals of each other. It may be preferred, however, in order that presently known synthesizing apparatus may be employed without change, to derive in the first instance a control current which is reciprocally related to the observed fundamental period of the voice; i.e., it is directly proportional to the voice pitch. This indirectly derived pitch control current is indistinguishable from the pitch control current of the prior art except in respect to its greater reliability, and may be employed in the presently known fashion.

The invention provides novel apparatus for identifying that value of the delay $\tau$ for which the balance between the delayed signal and the undelayed signal is best, for determining the magnitude of this value of the delay $\tau$, and for deriving a period-control or pitch-control signal which bears a preassigned unambiguous relation to it. Because the best balance between the delayed signal and the undelayed signal is manifested as a minimum value of the difference signal between them, an important component of this apparatus is a "minimum picker." The apparatus proceeds by scanning the various values of $\tau$ in the time domain until it finds the difference signal minimum. Meanwhile a storage device is being charged in a controlled fashion. The minimum value of the difference signal acts to terminate the charging operation, and the termination of the charging operation in turn terminates a pulse which was initiated at the beginning of the scanning operation. Hence, the length of this pulse on the time scale is equal to that value of the delay for which the minimum difference signal occurs, and so to the fundamental period which is being sought for.

This null method of determining the conditions under which the best match is obtained offers marked advantages over other methods, e.g., the method of multiplying the delayed signal by the undelayed signal and searching for a maximum value of the product. Such products differ very widely in amplitude, and the apparatus which recognizes them must normally include some means for amplitude normalization. All such complexities are avoided by employing the null method in which the departure of a minimum value of the difference signal from the exact zero value is to a large extent independent of the signal amplitude, and, in the case of voiced sounds, is always small.

The invention will be fully apprehended from the following detailed description of a preferred illustrative embodiment thereof taken in connection with the appended drawings in which:

Fig. 2 is a schematic circuit diagram showing an alternative to a component of Fig. 1;

Fig. 3 is a schematic circuit diagram showing artificial voice production apparatus embodying the invention; and Fig. 4 is a group of waveform diagrams of assistance in the expositon of the invention.

Figure 1:
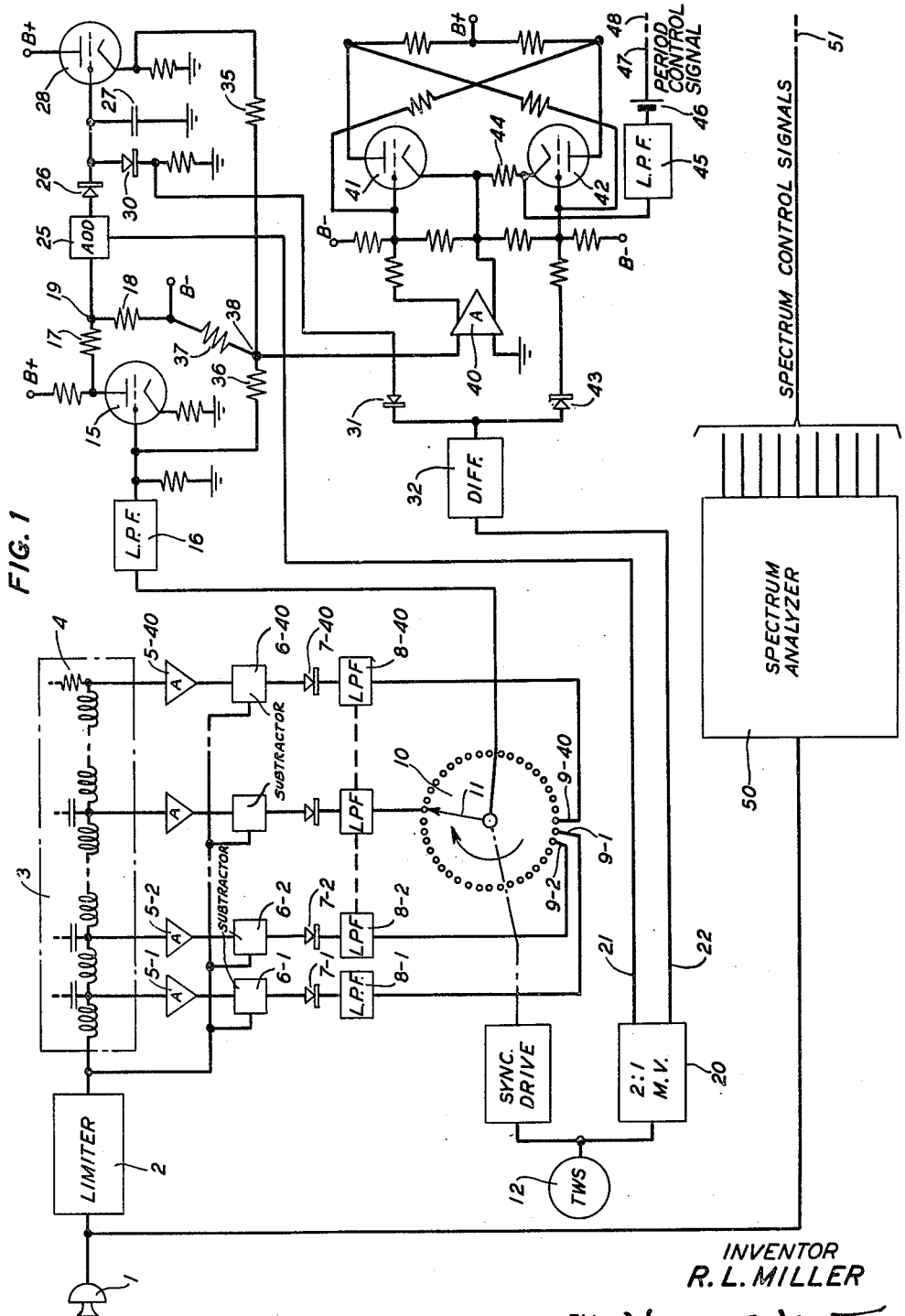
Fig. 1 is a schematic circuit diagram showing the analyzer portion of a vocoder transmission system embodying the invention.

Referring now to the drawings, and in particular to Fig. 1, speech currents, which may originate in a microphone 1 are first passed through a limiter or clipper 2 and then applied to the apparatus shown in the upper part of the figure which operates to determine the pitch of the speech in the time domain. The limiter 2, which may be of any desired variety, is included in order to remove wide amplitude excursions of the speech wave and so to accentuate its component frequencies and their variations and to suppress its amplitude variations.

As a refinement, the energy of the voice wave may be broken into a number of sub-bands, and the amplitudes of the several resulting waves individually clipped or limited before recombination. Apparatus for this purpose, which may be substituted for the limiter 2 of Fig. 1, is shown in Fig. 2. A second band-pass filter is preferably included following each limiter to remove high frequency components introduced by the limiter.

The apparatus which extracts the period signal comprises a delay device, such as an electromagnetic transmission line 3. The latter may comprise, for example, forty similar sections of series inductance and shunt capacitance connected in tandem, and an equal number of evenly spaced taps; i.e., one located at every section. The line may be terminated in well known fashion for no reflection by a resistive load 4. In terms of propagation time along the transmission line the spacing between each tap and the next may be 500 microseconds, the total delay for all forty sections being thus 20,000 microseconds or 20 milliseconds.

The clipped speech wave, applied to the input terminals of the transmission line 3, reappears at each of the several taps, delayed in time by 500 microseconds. Inherent loss contributed by the line 3 may be compensated by the interposition of amplifiers 5 to bring the several output signals thus delayed to a common level. One input terminal of a subtractor 6 is connected to each of these amplifiers, and the output terminal of the subtractor 6, a rectifier 7, and a low-pass filter 8 are connected together in tandem in the order named. Each of these elements may be of well known construction. The undelayed signal derived from the output terminal of the limiter 2 is applied in parallel to the second input points of all of these substractors 6. Each filter 8 is in turn connected to one segment 9 of a commutator 10 whose segments 9 are contacted in turn by a wiper arm 11 synchronously driven by the pulse output of a timing wave source 12.

In practical apparatus it is advantageous to employ electronic components for the commutator 10 which for the sake of simplicity of the drawings has been shown in its elementary mechanical form.

With this arrangement it is apparent that the signal which appears at each segment 9 of the commutator 10 is proportional to the difference between the undelayed signal and the same signal delayed by a lag time $\tau$ equal to the propagation time along the transmission line 3, from its input terminal to the tap in question. Furthermore, by reason of the interposition of the rectifiers 7 and low-pass filters 8, these differences take the form of absolute values from which high-frequency variations have been removed.

As the wiper arm 11 makes contact with the segments of the commutator 10 in succession it picks up these rectified, filtered, and therefore averaged, difference signals in succession and applies them as signal samples to the grid of a triode 15. A ripple unavoidedly introduced by the commutator 10 and having the sampling frequency may be removed by the interposition of a low-pass filter 16.

Because the successive periods of a speech wave are nearly alike, the difference signal thus applied to the grid of the triode 15 reaches a minimum for that value of the lag $\tau$ which is equal to the fundamental period, and has greater values both for larger and for smaller values of $\tau$. This situation is illustrated in Fig. 4, wherein the curve A shows the rectified and filtered difference signal for two successive cycles of rotation of the commutator 10. Each cycle commences with a non-zero value for the difference signal which results from subtracting the undelayed wave from the output of the first tap of the transmission line 3 that is utilized. This is because as a practical matter, it is not economical to provide a tap, an amplifier 5, a substractor 6, a rectifier 7, a filter 8 and a commutator segment 9 at points of the transmission line 3 which are so close to its input terminal that they correspond to unrealistic values of the lag $\tau$; i.e., to speech wave periods which are so short that they are never encountered in practice.

Due to the action of the rectifiers 7, this minimum value of the difference signal has the form of a fairly sharp cusp, $a$ in the first cycle and, again, $a'$ in the second cycle, as shown in curve A of Fig. 4. For simplicity of illustration, the cusp $a$ is shown as extending to zero potential, although for operation of the apparatus to be described, it need only extend to a lower potential than any other point of the curve A within the first cycle of rotation of the commutator. The same holds for the cusp $a'$ in the second cycle. The action of the triode 15 is to invert the phase of this wave A, as shown in curve B of Fig. 4. Furthermore, adjustment of the gain of the triode 15 and of the magnitudes of two resistors 17, 18, connected respectively to the anode of the tube 15 and to a point of negative potential, operates to bring the phase-inverted wave B, as it appears at the common terminal 19 of these two resistors, to the potential conditions shown; namely, a swing of about 25 volts, the positive-going cusps being represented by positive excursions of about 5 volts above ground potential.

At this point 19 there is added to the signal B a square wave C having twice the period of the wave B; i.e., one-half the frequency of rotation of the commutator 10, and adjusted in phase as shown in Fig. 4. This square wave may be derived by the application of the output pulses of the timing wave source 12 to control a conventional two-to-one stepdown multivibrator 20. Such a multivibrator normally has two equally accessible output terminals 21, 22, at which waves of like form and of opposite polarity appear. The wave C appears at a first one of these terminals 21. By adjustment of the phase of the rotation of the wiper arm 11 with respect to the output wave of the multivibrator 20, it is a simple matter to arrange that the multivibrator 20 output shall reverse in polariy upon the completion of each full rotation of the commutator 10 and shall do so at the instant when the wiper arm 11 makes contact with the commutator segment 9—1 that is connected to the first delay tap of the transmission line.

The wave C is combined with the wave B by an adder 25 of any desired construction. The sum of these two waves is evidently of the form shown in curve D of Fig. 4. This is applied by way of a rectifier 26 to a storage condenser 27, and to the grid of a second triode 28 connected as a cathode follower.

The action of this portion of the circuit is as follows:

Assuming that the potentials on either side of the rectifier 26 have been equilized then, as the difference wave A rises from its initial value at the start of the commutator cycle and, correspondingly, its inverse waves B and D fall in potential, current tends to flow from right to left through the rectifier 26. This immediately places it in its high resistance condition and blocks such current flow. Accordingly, the potential of its right-hand terminal, which is the same as the potential of the condenser 27, remains constant throughout this portion of the cycle and until the maximum of the curve A and the minimum of the curve D have been passed and the curve D again reaches its initial potential. The continued increase of potential of the wave D drives the rectifier 26 into its low resistance condition, whereupon current flows through it from left to right to increase the charge on the condenser 27. This action continues until the cusp $d$ of the wave D is reached.

When the cusp $d$ is passed and the wave D proceeds to fall in potential, the voltage on the condenser 27 exceeds the applied voltage so that the rectifier 26 is again biased in its reverse direction to become a high impedance and so prevents the discharge of the condenser 27. During the ensuing cycle of the rotation of the commutator 10 the output voltage, curve C, of the two-to-one stepdown multivibrator 20 has fallen to a negative potential, so that the ensuing rise of the curve D to its second cusp $d'$ is insufficient to drive the rectifier 26 into its low resistance condition. Therefore, the charge on the storage condenser 27 remains unaltered. The condenser charge thus holds until the next reversal of sign of the wave C from the two-to-one stepdown multivibrator 20 at which time the storage condenser 27 is discharged and placed in readiness for a repetition of the foregoing operations. Accordingly, the waveform of the voltage on the storage condenser 27 is as shown in the curve G.

The discharge of the storage condenser 27 is conveniently effected by application of a brief negative pulse which is applied to one terminal of a rectifier 30, thus to drive it into its low impedance condition and permit the condenser 27 to be discharged to ground. This discharging pulse may in turn be conveniently derived through a routing diode 31 from a differentiator 32 connected to the second output terminal 22 of the two-to-one stepdown multivibrator 20. The waveform of the output of the multivibrator 20 as it appears on the second terminal 22 is an inverted replica of the curve C. It is shown in the curve E. Consequently, the differentiation of such a wave produces a series of sharp pips which are alternately positive and negative in sign as shown in the curve F. Each positive pip occurs at the conclusion of an odd-numbered cycle of the rotation of the commutator 10 while each negative pip occurs at the completion of an even-numbered cycle. The routing diode 31 prevents the positive pips from reaching the discharging rectifier 30 and allows each negative pip to reach the discharging rectifier 30 to accomplish the discharge of the storage condenser 27 in the foregoing fashion.

As a consequence of these operations the voltage on the storage condenser 27 rises gradually to a potential equal to the sum of the potential of the wave B at its cusp $b$ and the wave C in the positive portion of its cycle, namely, to a potential of about 25 volts. It reaches this voltage during the first cycle of rotation of the commutator 10 and at some instant therein which is proportional to that value of the lag $\tau$ for which the cusp $b$ of the wave B obtains, representing a minimum of the difference signal. Hence the displacement of this instant from the commencement of the commutator cycle is representative of the length of the fundamental period of the speech wave.

The charge of the storage condenser 27 now remains constant throughout the ensuing cycle of the rotation of the commutator 10, and until it is discharged by the reset pulse as described above. It is during this ensuing cycle that the instant of reaching full charge is measured. This measurement and the reset operation take place as follows.

The condenser voltage wave G is applied to the grid of the second triode 28, which is connected for action as a cathode follower. The cathode follower output therefore has the same form as the wave G. It is applied by way of a padding resistor 35 to an addition point 38, to which are similarly applied the input wave A and a constant negative potential of 25 volts. The sum of the wave G and the constant negative potential has the form of the wave H. The addition, in turn, of the input wave A to the wave H gives a wave having the form of the wave J. This sum wave is inverted in phase by an amplifier 40 to produce a wave of the form K.

A conventional double-stability Eccles-Jordan circuit comprising two triodes 41, 42 and a resistive path intercoupling the anode of each tube with the grid of the other is provided. The wave K is applied to the grid of one of these tubes 41, while the positive pips of the wave F, derived from the differentiator 32 are applied through a routing diode 43 to the grid of the other tube 42. Each positive pip trips the circuit On, while the next cusp $k'$ of the wave K trips it Off again. The output of the circuit, which may be taken across a resistor 44 in series with the cathode of one of the triodes 42, thus comprises a positive voltage which has its inception at the commencement of an even-numbered cycle of the commutator rotation, while its termination coincides with the occurence of the cusp $k'$ of the wave K. Hence, the duration of the output pulse as shown in the wave L, is proportional to the time which elapses between the commencement of the scan by the commutator 10 of the taps of the transmission line 3 and the arrival of the wiper arm 11 at that tap for which the difference signal picked up is a minimum. This is in turn proportional to the fundamental period of the speech wave. The pulse L is converted into a steady control voltage whose magnitude is proportional to the fundamental period simply by the interposition of a low-pass filter 45. By the interposition of a battery 46 a constant voltage may be added to the output of this filter 45 to compensate for the fact that a pulse L of zero length, corresponding to location of the cusp $a$ of the wave A at the start of the rotation cycle of the commutator, indicates a speech period of a length corresponding to propagation over the untapped portion of the transmission line 3. The sum of the voltage of this battery 46 and the output of the filter 45 thus constitutes a period control signal at point 47 whose magnitude is proportional to the length of the fundamental period of the speech wave. It may be transmitted over a channel 48 to a synthesizer station, shown in Fig. 3.

The input speech wave derived from the microphone 1 is also applied to a spectrum analyzer 50 which may be of any well known form such as that described in Dudley Patent 2,151,091 or in Steinberg Patent 2,635,146, which delivers spectrum control signals. These are transmitted over an intervening medium via a channel 51 to a spectrum synthesizer 52 which may likewise be as shown in the Dudley patent or the Steinberg patent or otherwise as desired.

Conventional vocoder synthesizer apparatus is provided with a hiss source and a buzz source, and a pitch control signal operates both to tune the buzz source and to control the switching as between the buzz source and the hiss source. Tuning of the buzz source is commonly accomplished by so constructing it that its output frequency is proportional to the potential applied to an electrode of an oscillator tube, and therefore to the pitch of the speech. In the present situation the period control signal, derived as described above, is proportional to the length of the fundamental period of the speech and therefore inversely proportional to its pitch. Hence, conventional apparatus, as conventionally controlled, would tune the buzz source in the wrong direction and accomplish the switching operations at the wrong times.

This condition is overcome, in accordance with the present illustrative example of the invention, by the provision of a modified buzz source 55 as shown in Fig. 3. Here the period control signal at point 47' is applied to the grid of a triode 56 which inverts its phase. The output of this triode 56 is applied to the anode of a gas discharge tube 57 whose grid may be connected to a point of fixed potential. This gas discharge tube 57, together with a condenser 58, a charging resistor 59 and a differentiating transformer 60 constitute a relaxation oscillator whose frequency increases with increasing anode potential, and vice versa. Thus, when the pitch of the speech is high the period control signal at point 47' is of low amplitude and, because of the phase inversion effected by the triode 56, the anode potential of the relaxation oscillator tube 57 is high, and vice versa. Hence, the frequency variations of the buzz source 55 follow the pitch variations of the speech.

In accordance with still another aspect of the invention, high frequencies of the speech, characteristic of voiced sounds, correspond to low amplitudes of the period control signal at point 47 which are insufficient to hold a relay 61 up against the tension of its restoring spring. Its moving arm therefore makes contact with the output coil of the buzz source 55 so that buzz source energy is delivered over a path 62 to the spectrum synthesizer 52. In the case of an unvoiced sound, there is no identifiable fundamental period, in which case the output pulse of the Eccles-Jordan circuits 41–44, curve L of Fig. 4, endures for the full cycle of the commutator 10. This can be assured by the introduction, at a suitable point of the circuit, of a threshold condition which may be adjusted to render inoperative all those portions of the apparatus which cooperate to recognize and pick the minimum of the wave A. With such adjustment the miscellaneous, randomly distributed, minor minima which characterize the difference signal in the case of an unvoiced sound are inoperative to generate a null value of the corresponding auxiliary signal J. In this situation the period control signal at point 47, which is the integral of the wave L over the commutator cycle, is of high level and so energizes the relay 61 to draw its moving arm away from the buzz source output terminal and into contact with the terminal of a hiss source 63, thus to supply hiss source energy to the spectrum synthesizer 52. Such a threshold condition can be secured in various ways, e.g., simply by adjustment of the amplitudes of the waves B and C with respect to the conduction potential of the rectifier 26.

Because of the complexity of an ordinary speech wave the difference signal which results from the balance of the undelayed wave against a replica of itself for all the different possible values of the lag $\tau$ is usually characterized by several minima in addition to the principal minimum corresponding to the lag $\tau$ equal to the fundamental period. But the fundamental minimum always extends closer to the zero axis than do these other minima. This condition is reflected, through the operations of the apparatus, in a number of cusps of the waves A, B and D of which the principal one discussed above is, however, always the most pronounced. Consequently in actual practice the storage condenser 27 may in fact receive several successive increments of charge during the initial portion of the cycle of rotation of the commutator 10 and such charge increments might be represented on a curve to replace the curve G of Fig. 4 by a series of steps in the early portion of the cycle of the commutator 10.

It is an important feature of the apparatus described above that it is insensitive to all such undesired partial minima of the difference wave and recognizes the principal minimum and the principal minimum only. It is another important feature of the apparatus that, by virtue of the fashion in which the wave K is built up, by addition of the wave A to the wave H, the critical cusp k' always reaches the same amplitude and so trips the Eccles-Jordan circuit to terminate the pulse L with the same degree of positiveness independent of the degree to which the principal minimum of the difference signal approachs the value zero.

What is claimed is:

1. Apparatus for deriving a control signal indicative of the fundamental period of a complex signal wave which comprises, means for delaying said wave by a variable lag $\tau$, means for subtracting the delayed wave from the undelayed wave to derive a difference wave, means for varying the lag $\tau$ through a range embracing various values, means for identifying that one of said various values of $\tau$ for which said difference wave has a minimum value, whereby said identified value of $\tau$ is of the same duration as said fundamental period, means for rejecting all others of said values of $\tau$, and means for deriving a control signal which is substantially proportional to said identified value of $\tau$.

2. Apparatus for deriving a control signal indicative of the fundamental period of a complex signal wave which comprises a limiter for reducing excursions of said wave to an approximately uniform level, means for delaying said limited wave by a variable lag $\tau$, means for subtracting the delayed limited wave from the undelayed limited wave to derive a difference wave, means for varying the lag $\tau$ through a range embracing various values, means for identifying that one of said various values of $\tau$ for which said difference wave has a minimum value, whereby said identified value of $\tau$ is of the same duration as said fundamental period, means for rejecting all others of said values of $\tau$, and means for deriving a control signal which is substantially proportional to said identified value of $\tau$.

3. Apparatus for determining the instant of occurrence of the principal minimum value of a first varying function of time with respect to a predetermined point on said first time function marking the beginning of a first period of said first time function which comprises a storage element, means operative throughout the first period of said first varying function of time for applying charge increments of one polarity to said element in proportion to variations of said time function in one sense, means for inhibiting removal of any such charge increment from said storage element until the end of the second period of said first time function whereby the charge on said element becomes fixed at the instant, within the first period of said first varying function of time, at which the variations of said time functions are altered in sense and remain so fixed until the end of the second period of said first time function, means for initiating a pulse at the commencement of the second period of said first varying function of time, means for terminating said pulse at an instant that is retarded, with respect to the instant of fixation of said charge, by an interval equal to the period of said first varying function of time, whereby the duration of said pulse varies conformably with the time elapsing between the inception of said first period of said first varying function of time and the occurrence of said principal minimum, and means for integrating said pulse to provide a control signal that is proportional to the duration of said pulse.

4. In combination with a source of a speech wave, apparatus for continuously determining the continuously varying fundamental period of said speech wave which comprises means for delaying said wave by a variable lag $\tau$, means for subtracting the delayed wave from the undelayed wave to provide a difference wave, means for varying the lag $\tau$ through a range of values extending substantially from zero to the longest speech wave period, means for identifying that value of $\tau$ for which said difference wave has a minimum magnitude, means for rejecting all others of said values of $\tau$, means for continually altering the value identified to preserve said minimal magnitude of said difference wave as said fundamental period changes, and means for developing a signal continuously representative of said varying identified value of $\tau$.

5. In combination with a source of a speech wave, apparatus for continuously determining the continuously varying fundamental period of said speech wave which comprises means for deriving from said wave a plurality of variously delayed replicas of said wave, the lengths of the individual delays characterizing said replicas covering a range extending substantially from zero to the longest speech wave period, means for subtracting each of said replicas from the undelayed wave to provide a difference wave, means for identifying the replica for which the difference wave has a minimum magnitude, means for rejecting all others of said replicas, whereby the delay characterizing the replica thus identified at each moment is equal to the length of said fundamental period at that moment, means for continually altering said identification to preserve the minimum magnitude of said difference wave as said fundamental period changes, and means for developing a signal continuously representative of the delay characterizing the replica momentarily identified.

6. Apparatus for determining the instant of occurrence of the principal minimum value of a first varying function of time, with respect to a predetermined point on said first time function marking the beginning of a first period of said first time function, which comprises means for inverting the phase of said first time function to provide a second time function, means for reproducing said second time function, means for generating a third function of time having a period equal to twice that of said first time function and having a first substantially constant value throughout the first period of said first function and a second substantially constant value throughout the second period of said first function, means for additively combining said second time function with said third time function, thereby to generate a fourth time function, a storage element, means for applying, during the first period of said first function, signal increments of one sign to said storage element in proportion to variations of said fourth time function in one sense, means for inhibiting removal of any such signal increment from said storage element during the second period of said first time function, whereby the signal increments applied to said storage elements constitute a fifth time function which remains unchanged throughout the second period of said first time function, means for additively combining said first time function with said fifth time function to provide a sixth time function having a zero value at the instant, during the second period of said first time function, of the minimum value of said first time function, means for determining the time which elapses between the inception of said second period of said first function and the occurrence of said zero value, and means for generating a period control signal in substantial proportion to said elapsed time.

7. Apparatus for determining the instant of occurrence of the prirncipal minimum value of a first varying function of time, with respect to a predetermined point on said first time function marking the beginning of a first period of said first time function, which comprises means for reproducing said first time function, means for inverting the phase of said first time function to provide a second time function, means for generating a third function of time having a period equal to twice that of said first time function and having a first substantially constant value throughout the first period of said first function and a second substantially constant value throughout the second period of said first function, means for additively combining said second time function with said third time function, thereby to generate a fourth time function, a storage element, means for applying, during the first period of said first function, signal increments of one sign to said storage element in proportion to variations of said fourth time function in one sense, means for inhibiting removal of any such signal increment from said storage element, during the second period of said first time function, whereby the signal increments applied to said storage elements constitute a fifth time function which remains unchanged throughout the second period of said first time function, means for additively combining said first time function with said fifth time function to provide a sixth time function having a zero value at the instant, during the second period of said first time function, of the minimum value of said first time function, means for deriving a pulse at the instant of transition of said third time function from its first value to its second value, means for terminating said pulse at the instant of said last named zero value instant, and means for integrating said pulse to provide a control signal which is substantially proportional to the duration of said pulse.

8. In combination with means, at an analyzer station, for deriving a control signal directly proportional to the length of the fundamental period of a speech wave, and means for deriving spectrum control signals representative of the character of said speech wave, apparatus for the production of artificial speech from said control signals which comprises a spectrum synthesizer, a buzz source, and a hiss source, means controlled by said period control signal for varying the frequency of said buzz source in inverse relation to said period control signal, connections for applying energy of said hiss source alone to said spectrum synthesizer under control of period control signals that are of magnitude in excess of a preassigned threshold and connections for applying energy of said buzz source alone to said spectrum synthesizer under control of period control signals that are of magnitude less than said threshold.

References Cited in the file of this patent

UNITED STATES PATENTS

| | | |
|---|---|---|
| 2,243,526 | Dudley | May 27, 1941 |
| 2,580,421 | Guanella | Jan. 1, 1952 |
| 2,593,694 | Peterson | Apr. 22, 1952 |
| 2,627,541 | Miller | Feb. 3, 1953 |
| 2,635,146 | Steinberg | Apr. 14, 1953 |
| 2,697,219 | Williams | Dec. 14, 1954 |
| 2,705,742 | Miller | Apr. 5, 1955 |
| 2,732,424 | Oliver | Jan. 24, 1956 |
| 2,766,450 | Frank | Oct. 9, 1956 |
| 2,832,044 | Bliss | Apr. 22, 1958 |